Aug. 31, 1965     P. A. MUELLER     3,203,704
ROTARY MECHANICAL SEAL
Filed Dec. 3, 1962
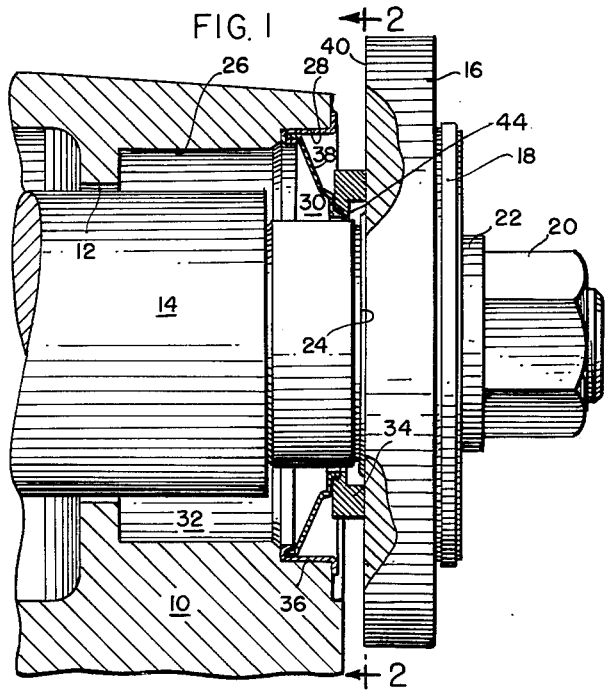
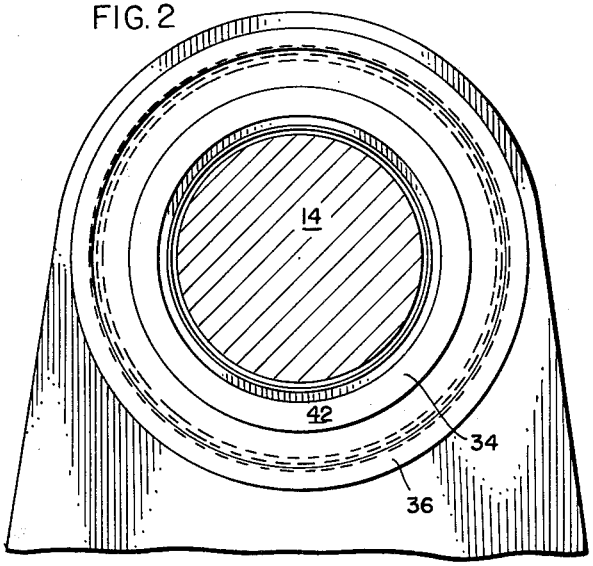
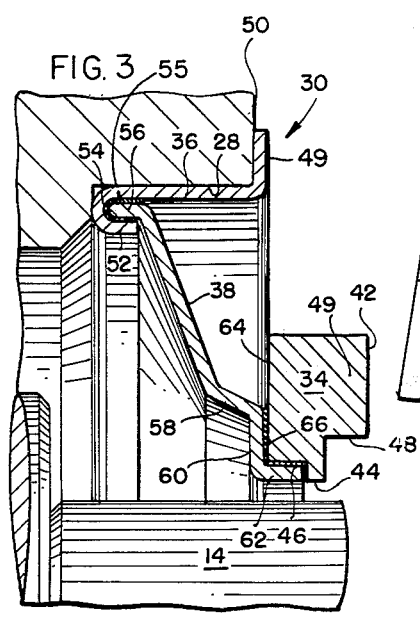
INVENTOR:
PETER A. MUELLER
BY
Norman Gerlach
ATT'Y United States Patent Office 3,203,704
Patented Aug. 31, 1965

3,203,704
ROTARY MECHANICAL SEAL
Peter A. Mueller, Oak Park, Ill., assignor to Mueller Seal Company, Lyons, Ill., a corporation of Delaware
Filed Dec. 3, 1962, Ser. No. 241,663
2 Claims. (Cl. 277—42)

The present invention relates generally to rotary mechanical seals of the type which effects a seal against the passage of fluid between relatively movable machine parts, such, for example, a shaft and a casing within which the shaft is rotatably mounted. More specifically, the invention relates to that type of mechanical seal in which the sealing effect between the relatively moving parts occurs at radially extending surfaces and a so-called running seal is provided between the moving parts.

The running surfaces of a rotary mechanical seal of the aforementioned type are usually provided on a pair of opposed sealing elements, one of which is commonly known as the seal "seat" and the other of which is commonly termed the sealing "washer." Usually, one of these elements is maintained stationary with respect to the part to which it is effectively sealed, while the other element is caused to rotate with the part to which it is effectively sealed. Sometimes, the seat is press-fitted within the opening in the casing through which the shaft extends, but more often than not, the seat is carried on the shaft and rotates therewith, while the washer which has a running fit or engagement with the seat forms a part of a washer assembly by means of which it is sealed to the wall of the opening and is thus maintained stationary except for its ability to shift axially to compensate for combined washer and seat wear. Such axial shifting seldom exceeds a few thousandths of an inch during the life of the seal.

The present invention is concerned with a novel form of washer assembly by means of which the washer proper of the rotary mechanical seal with which the assembly is employed is effectively sealed to the wall of a liquid-containing pump chamber, tank, oil reservoir, chamber, or the like, such wall having an opening through which the rotary shaft extends.

One type of washer assembly which is in use at the present time utilizes four principal parts, namely, a washer proper, a spring for urging the washer forwardly against the seat with the proper degree of pressure to exclude passage of fluid radially past the running seal surfaces but not with such extreme pressure as to shut off the necessary amount of fluid for lubrication and anti-squeal purposes, a bellows of elastomeric material for sealing the washer to the opening-equipped wall of the pump casing, or other housing, and a retainer, usually of brass, for maintaining the washer proper, the spring, and the bellows in their operative positions. The retainer is adapted to be press-fitted into the shaft opening, or alternatively, into a recess around the opening.

It is among the principal objects of the invention to provide in a rotary mechanical seal a novel washer assembly wherein the spring and bellows combination as outlined above is eliminated, and in its stead, there is substituted a single metal element in the form of an imperforate ring of frusto-conical design, this ring serving the dual function of yieldingly urging the washer proper forwardly against the seat, and of sealing the washer to the surrounding retainer, which, in turn, is adapted to be sealed by a press fit to the casing or housing wall which defines the opening through which the rotating shaft extends.

An additional object of the invention is to provide in connection with a rotary mechanical seal a washer assembly which is comprised of but three parts, namely, the washer proper, the stainless steel ring, and the retainer, and has associated therewith novel means for permanently attaching the washer proper to the ring and for permanently attaching the ring to the retainer, thus providing a simple three-piece assembly which is capable of being manufactured as a package-type unit. By such an arrangement, it is unnecessary to effect a direct interlocking connection between the retainer and the washer proper inasmuch as the ring which extends between these two parts, in addition to performing its sealing function, also affords the necessary interlocking connection. Furthermore, no mechanical interlock between the retainer and the washer proper is required to hold the washer proper within the assembly since both the washer and the retainer are permanently affixed to the ring. Thus, for a package-type seal wherein all of the parts are permanently assembled upon one another, considerably less metal is required in forming the retainer and a lighter and more compact washer assembly results.

A further advantage that accrues from the present invention resides in the fact that because of the elimination of the spring and bellows elements of a conventional rotary mechanical seal of the type under consideration, and because of the fact that no direct mechanical interconnection between the retainer and washer proper is required, a seal of shorter proportions results, such a seal being capable of installation in structures where space is at a premium and where a seal of relatively large axial extent could not be made to fit.

Other objects and advantages of the invention will become apparent from a consideration of the following detailed description.

The invention consists in the novel construction, combination and arrangement of parts shown in the accompanying single sheet of drawings forming a part of this specification.

In this drawing:

FIG. 1 is a fragmentary sectional view, with the parts in elevation, taken substantially centrally and longitudinally through a rotary mechanical seal constructed according to the present invention, and showing the seal operatively installed on an automotive propeller shaft;

FIG. 2 is a sectional view taken on the line 2—2 of FIG. 1; and

FIG. 3 is an enlarged radial sectional view taken through a portion of the structure of FIG. 1.

Referring now to the drawing in detail, the structure selected for illustration herein is a typical environment for the rotary mechanical seal of the present invention and represents the application of the seal to a recessed opening in an engine block, such opening having one end of the engine propeller shaft projecting through it. A fragment of the engine block is designated by the reference numeral 10, the opening is designated by the reference numeral 12, and the propeller shaft is designated by the reference numeral 14. The shaft 14 is rotatably mounted in the usual main engine bearings (not shown) and carries at its outer end a flywheel 16 having the usual power take-off belt and pulley arrangement 18. A nut 20 and a washer 22 serve to clamp the flywheel 16 against an annular shoulder 24 on the shaft 14. The opening 12 is recessed by a first counterbore 26 which, in turn, is recessed by a second and larger counterbore 28.

The seal or washer assembly of the present rotary mechanical seal has been designated in its entirety by the reference numeral 30 and is provided for the purpose of preventing passage of oil or other fluid outwardly along the annular space 32 between the recessed opening 12 and the shaft 14. The seal assembly 30 comprises three principal parts, namely, a sealing washer 34, a retainer 36, and a compression or backing ring 38. The ring is of generally frusto-conical design and has its small base fixedly secured to the washer 34 and its large base fixedly secured to the retainer 36 in a manner that will be made clear presently. The washer 34 is designed for running sealing engagement with the rear or inside surface 40 of the flywheel 16, this surface constituting a seat for the washer in the usual manner of washer and seat cooperation.

The washer 34 is in the form of a circular ring which surrounds the shaft 14 and presents its running annular seal surface 42 to the opposed seal surface 40 of the flywheel 16. These two running seal surfaces are preferably lapped to an extremely high degree of flatness, on the order of 0.0007 inch, approximately the wave length of light so that they will exclude the entrance therebetween of liquid except in such minute quantity as to maintain lubrication of these surfaces for anti-friction and anti-squeal purposes. As best shown in FIG. 3, the washer 34 has formed therein a central opening 44 of a diameter appreciably greater than the diameter of the shaft 14. The opening 44 is provided in the rear region thereof with a shallow annular recess 46 for a purpose that will be made clear presently. The forward region of the opening 44 also is provided with a deeper annular recess 48, thus establishing the usual forwardly projecting nosepiece 49 so that the radial thickness of the seal surface 42 is somewhat less than the over-all radial thickness of the washer as a whole. The recesses 46 and 48 are preferably in the nature of counterbores. The washer 34 may be formed of any one of a number of materials, as, for example, close-grained cast iron, brass, stainless steel, or the like. One material which has been found particularly useful in the manufacture of automotive seals is a synthetic thermosetting resin containing a powdered metal alloy of lead, antimony and tin. Where caustic materials are involved in a pump, for example, a ceramic material may be employed in constructing the washer. The ring 38 of the assembly 30 is arranged so that its small base or rim region bears in the direction of the washer 34. In order to supply the necessary degree of sealing pressure between the running seal surfaces 40 and 42, the frustro-conical compression ring 38 has its forward small rim region fixedly secured to the washer and its rear large rim region fixedly secured to the retainer 36, the latter being press-fitted within the counterbore 28 so that it provides the necessary reaction for forward thrust on the washer by the ring 38.

The retainer 36 of the assembly 30 is in the form of a generally cylindrical ring which preferably is formed of stainless steel and is of such diameter that it fits tightly within the counterbore 28. At its forward end, the retainer is provided with an annular outwardly extending rim flange 49 which bears against the front face 50 of the engine block 10 and limits the rearward position of the retainer as a whole within the counterbore 28. The rear rim of the cylindrical retainer is provided with an integral inturned reentrant portion 52 which provides an annular channel 54. The rear large rim region of the compression ring 38 extends into this channel and is fixedly secured therein by an epoxy adhesive such as has been designated at 55. Numerous epoxy adhesives are available on the market for use in connection with the bonding of the compression ring 38 to the retainer 36, one such adhesive being manufactured and sold by Devcon Corporation of Danvers, Connecticut under the trade name "Devcon" and consisting of the usual base resin "Devcon A" and hardener "Devcon B." The width of the annular channel 54 is greater than the thickness of the metal of the compression ring 38 and the extreme rear rim region of the ring 38 is turned laterally out of the frusto-conical confines of the ring to provide a short cylindrical section 56 which projects into the channel 54 and is of such diameter than it may be centered coaxially within the channel and out of contact with the channel side walls. With the cylindrical section 56 of the ring 38 thus centered in the channel 54, the section may be substantially embedded in the epoxy adhesive 55 with the latter adhering to both sides of the section 56, as well as to the walls of the channel 54 so that there will be no possibility of the compression ring 38 pulling out of or away from the retainer 36 when the seal assembly 30 is in its free state and also so that there will be no circumferential slippage between the bonded parts (36, 38).

The frusto-conical uniformity of the compression ring 38 is interrupted by a short section 58 of steeper slant angle, this section 58 merging with a flat radial section 60 which, in turn, joins a forwardly turned cylindrical section 62 at the extreme forward rim region of the ring. This cylindrical section 62 extends into the shallow recess 46 and substantially fills the same so that the inside face of the cylindrical section 62 lies substantially flush with the wall of the central opening 44 in the washer 34. The radial section 60 opposes the rear end face 64 of the washer 34 and a layer of epoxy adhesive 66 serves to bond the radial section 60 to the end face 64 and also to bond the cylindrical section 62 within the recess 46. The epoxy adhesive 66 for thus bonding the forward end region of the compression ring 38 to the washer 34 may be the same as the epoxy adhesive which is employed for bonding the rear end region of the ring 38 to the retainer 36.

It is to be noted at this point that an appreciable quantity of the epoxy adhesive is employed at both the front and rear regions of the compression ring 38, the two masses of the adhesive 54 and 66 taking on definite shape and becoming extremely hard upon polymerization thereof at the time of manufacture of the seal assembly 30. The use of a resin-type epoxy adhesive for securing the compression ring 38 to the washer 34 and the retainer 36 eliminates the necessity of employing mechanical interlocking means between the various parts, either to hold them together or to establish a non-rotating connection between these parts. It also simplifies the construction of the washer 34 since the central bore therethrough may be made truly circular with no notches or other irregularities in its contour being necessary. The epoxy adhesive masses further make possible the provision of an extremely stable package-type unit which will withstand rough handling without danger of the various parts becoming separated.

In the operation of the seal, after the retainer 36 has been pressed into the counterbore 28 in the engine block 10 and the flywheel 16 has been operatively mounted on the shaft 14, the washer 34 will be yieldingly urged forwardly against the annular seat surface existing on the rear surface 40 of the flywheel. The epoxy adhesive 66 at the small base or rim region of the frusto-conical compression ring 38 will serve to establish a rigid connection between the ring 38 and the washer so that the latter will not turn in either direction relatively to the ring. It also will effectively seal the forward rim region of the ring 38 to the washer. The frusto-conical ring 38 will be placed under an appreciable degree of compression and a certain amount of flexing will take place tending to increase the slant angle of the ring. As the nosepiece 49 gradually wears during continued use of the seal, the frusto-conical compression ring 38 will continue to urge the washer 34 forwardly against the seat and thus take up wear.

The invention is not to be limited to the exact arrangement shown in the accompanying drawing or described in this specificaiton as various changes in the details of construction may be resorted to without departing from the spirit or scope of the invention. Therefore, only insofar as the invention has particularly been pointed out in the accompanying claims is it to be limited.

Having thus described the invention what I claim as new and desire to secure by Letters Patent is:

1. In a rotary mechanical seal for sealing a housing wall opening through which a rotatable shaft extends, in combination, an anti-friction washer having a cylindrical opening extending therethrough and adapted to surround the shaft, said washer having an annular forward end face designed for running engagement with a cooperating annular radial surface normal to and turning with the shaft, a generally cylindrical retainer encircling at least the rear end region of the washer and adapted to be pressed into the housing wall opening, the rear rim region of said retainer being provided with an inturned and reentrant flange defining a forwardly facing annular channel, a thin flexible imperforate generally frusto-conical compression ring formed of spring material and having its large end projecting into the retainer and seated within said channel, a quantity of resin-type epoxy adhesive disposed within said channel and fixedly securing the large end of the frusto-conical compression ring to the retainer, the small end of said compression ring being provided with a short forwardly turned cylindrical portion which extends into the cylindrical opening in the washer, and a quantity of an epoxy resin interposed between the wall of the cylindrical opening in the washer and said forwardly turned cylindrical portion and serving fixedly to secure the compression ring to the washer.

2. In a rotary mechanical seal for sealing a housing wall opening through which a rotatable shaft extends, in combination, an anti-friction washer having a cylindrical opening extending therethrough and adapted to surround the shaft, said washer having an annular forward end face designed for running engagement with a cooperating annular radial surface normal to and turning with the shaft, and an annular rear end face, a generally cylindrical retainer encircling at least the rear end region of the washer and adapted to be pressed into the housing wall opening, a thin flexible imperforate generally frusto-conical compression ring formed of spring material and having its large end projecting into the retainer, the rear rim region of said retainer being provided with an inturned and reentrant flange defining a forwardly facing annular channel, the rim region of said compression ring at its large end being provided with a short cylindrical section projecting into said channel and extending therearound, a quantity of resin-type epoxy adhesive disposed within the channel and serving fixedly to retain said cylindrical section of the compression ring within said channel, a limited section of the compression ring at its small end being turned forwardly on a steeper slant angle than the remainder of the ring, and then being turned radially inwardly so as to bear coextensively against said rear end face of the washer, and finally being turned forwardly to provide a short cylindrical section which projects into the cylindrical opening in the washer, and a quantity of an epoxy resin interposed between the rear end face of the washer and the inwardly turned portion of the compression ring, and also between the wall of the opening in the washer and said short cylindrical section of the compression ring.

References Cited by the Examiner
UNITED STATES PATENTS

| | | | |
|---|---|---|---|
| 2,189,197 | 2/40 | Cerny | 277—42 |
| 2,236,902 | 4/41 | Haller et al. | 277—88 X |
| 2,267,994 | 12/41 | Reynolds et al. | 277—90 X |
| 2,809,130 | 10/57 | Rappaport | 277—235 X |
| 2,866,656 | 12/58 | Dobrosavljevic | 277—90 X |

LAVERNE D. GEIGER, *Primary Examiner.*

SAMUEL B. ROTHBERG, *Examiner.*